United States Patent
Ohbitsu

(10) Patent No.: US 9,854,223 B2
(45) Date of Patent: Dec. 26, 2017

(54) STEREOSCOPIC MOVING PICTURE GENERATING APPARATUS AND STEREOSCOPIC MOVING PICTURE GENERATING METHOD

(71) Applicant: FUJITSU LIMITED, Kawasaki-shi, Kanagawa (JP)

(72) Inventor: Toshiro Ohbitsu, Akishima (JP)

(73) Assignee: FUJITSU LIMITED, Kawasaki (JP)

( * ) Notice: Subject to any disclaimer, the term of this patent is extended or adjusted under 35 U.S.C. 154(b) by 1084 days.

(21) Appl. No.: 14/069,981

(22) Filed: Nov. 1, 2013

(65) Prior Publication Data

US 2014/0063195 A1    Mar. 6, 2014

Related U.S. Application Data

(63) Continuation of application No. PCT/JP2011/060604, filed on May 6, 2011.

(51) Int. Cl.
H04N 13/02 (2006.01)
H04N 13/00 (2006.01)

(52) U.S. Cl.
CPC ..... *H04N 13/0203* (2013.01); *H04N 13/0022* (2013.01); *H04N 2013/0081* (2013.01); *H04N 2013/0092* (2013.01)

(58) Field of Classification Search
None
See application file for complete search history.

(56) References Cited

U.S. PATENT DOCUMENTS 5,784,097 A    7/1998 Iinuma et al.
6,005,607 A    12/1999 Uomori et al.
(Continued)

FOREIGN PATENT DOCUMENTS

JP    8-009421    1/1996
JP    08-331598    12/1996
(Continued)

OTHER PUBLICATIONS

Notification of Transmittal of Translation of the International Preliminary Report on Patentability (Form PCT/IB/338, Form PCT/IB/373 & Form PCT/ISA/237), PCT/JP2011/060604, 6 pages, dated Nov. 28, 2013.
(Continued)

*Primary Examiner* — James M Anderson, II
(74) *Attorney, Agent, or Firm* — Fujitsu Patent Center

(57) ABSTRACT

A stereoscopic picture generating apparatus comprising: a storage unit to get stored with a first image containing partial images and a second image containing partial images corresponding respectively to the partial images contained in the first image; and an arithmetic unit to extract a first position defined as an existing position of a first partial image contained in the first image and a second position defined as an existing position of a second partial image contained in the first image, to calculate a first differential quantity defined as a difference between the first position and the second position, to calculate a third position defined as a new existing position of a third partial image contained in the second image that corresponds to the first partial image based on the first differential quantity, and to generate a third image based on the third position of the third partial image.

12 Claims, 10 Drawing Sheets

(56) References Cited

U.S. PATENT DOCUMENTS

| | | | |
|---|---|---|---|
| 6,864,910 B1 | 3/2005 | Ogino et al. | |
| 2002/0113865 A1 | 8/2002 | Yano et al. | |
| 2006/0192776 A1 | 8/2006 | Nomura et al. | |
| 2007/0248260 A1 | 10/2007 | Pockett | |
| 2009/0310935 A1* | 12/2009 | Era | H04N 13/026 386/248 |
| 2011/0292045 A1 | 12/2011 | Nakamura et al. | |
| 2012/0219208 A1 | 8/2012 | Ishiyama et al. | |

FOREIGN PATENT DOCUMENTS

| | | | |
|---|---|---|---|
| JP | 9-074573 | 3/1997 | |
| JP | 9-224267 | 8/1997 | |
| JP | 11-088910 | 3/1999 | |
| JP | 2001-016620 | 1/2001 | |
| JP | 2004-349736 | 12/2004 | |
| JP | 2010-206774 | 9/2010 | |
| JP | 2011-081630 | 4/2011 | |
| WO | 2005/060271 A1 | 6/2005 | |
| WO | 2011/052389 | 5/2011 | |
| WO | 20111052389 | 5/2011 | |
| WO | WO 2011052389 A1 * | 5/2011 | G03B 35/00 |

OTHER PUBLICATIONS

EESR—The Extended European Search Report dated Aug. 29, 2014 issued in the corresponding European application No. 11865149.6.
International Search Report, mailed in connection with PCT/JP2011/060604 and dated Aug. 9, 2011.

* cited by examiner

FIG. 8

| DISTANCE (PIXEL COUNT) | PARALLAX PHASE ANGLEθ0 |
|---|---|
| SMALLER THAN 100 | 5 |
| EQUAL TO OR LARGER THAN 100 BUT SMALLER THAN 200 | 10 |
| EQUAL TO OR LARGER THAN 200 BUT SMALLER THAN 300 | 15 |
| EQUAL TO OR LARGER THAN 300 BUT SMALLER THAN 400 | 20 |
| EQUAL TO OR LARGER THAN 400 BUT SMALLER THAN 500 | 25 |
| EQUAL TO OR LARGER THAN 500 | 30 |

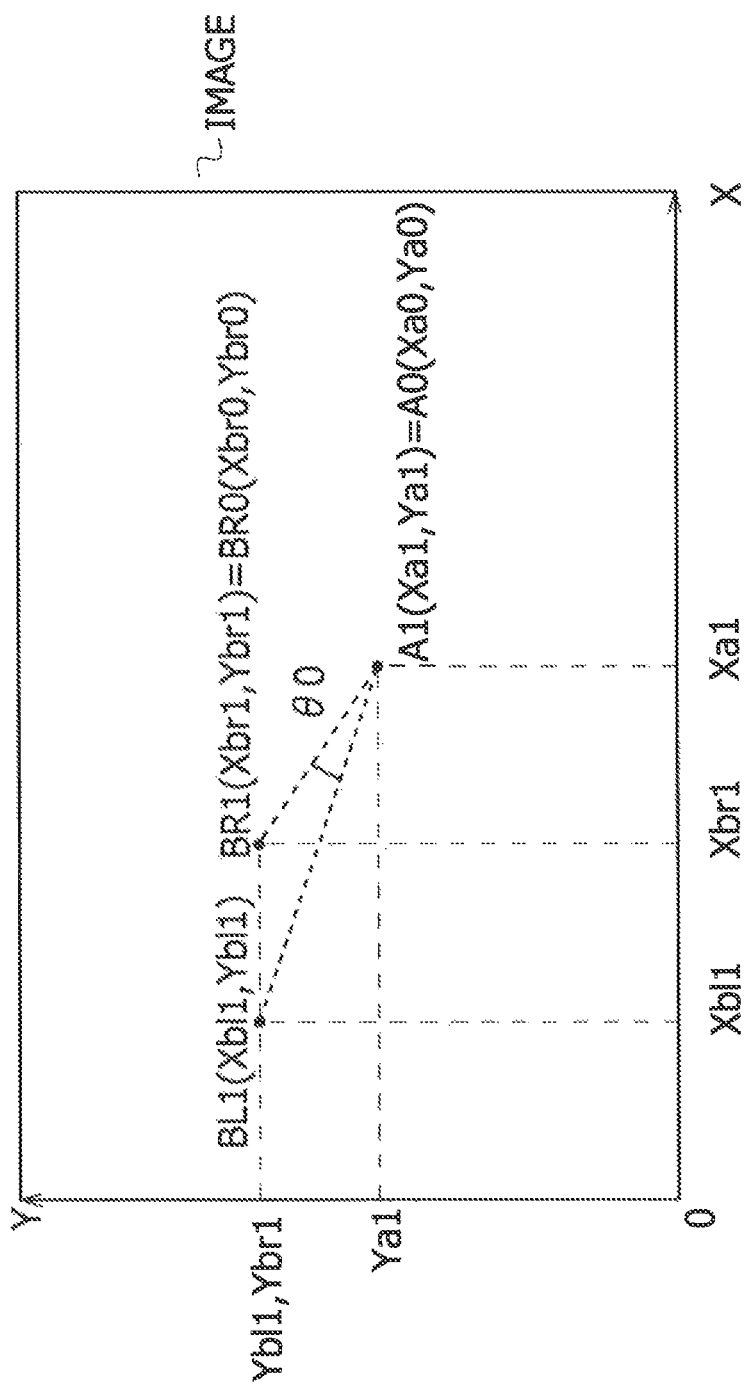

STEREOSCOPIC MOVING PICTURE GENERATING APPARATUS AND STEREOSCOPIC MOVING PICTURE GENERATING METHOD

CROSS-REFERENCE TO RELATED APPLICATION

This is a continuation of application, filed under 35 U.S.C. §111(a) of International Application PCT/JP2011/060604, filed on May 6, 2011, the contents of which are herein wholly incorporated by reference.

FIELD

The present invention relates to a stereoscopic moving picture generating apparatus, a moving picture generating method and a moving picture generating program.

BACKGROUND

There is a moving picture generating apparatus for generating images that can be stereoscopically viewed by making use of a parallax between the images captured by two cameras adjacent to each other. The moving picture generating apparatus generates and displays the image captured by one camera as an image for a left eye and the image captured by the other camera as an image for a right eye in the images captured by the two adjacent cameras, thereby making a viewer perceive the stereoscopic image.

With respect to the same physical object, a difference between a position in the image for the left eye and a position in the image for the right eye is referred to as a parallax. When parallax quantities are different between two physical objects existing within the image (picture), one physical object appears to exist nearer or farther than the other physical object. The parallax quantity is defined as a magnitude of the parallax.

FIG. 1 is a diagram illustrating an example of the stereoscopic picture. In FIG. 1, an image 910 is an image for a left eye, and an image 920 is an image for a right eye. Herein, an object A, an object B and an object C exist in each of the image 910 as the image for the left eye and the image 920 as the image for the right eye. Due to parallaxes of these objects between the image 910 and the image 920, a person looking at the stereoscopic picture in FIG. 1 views the object A, the object B and the object C as if existing in this sequence from the near side.

DOCUMENTS OF PRIOR ARTS

Patent Document

[Patent document 1] Japanese Patent Application Laid-Open Publication No. 11-088910
[Patent document 2] Japanese Patent Application Laid-Open Publication No. H08-331598
[Patent document 3] Japanese Patent Application Laid-Open Publication No. H09-074573
[Patent document 4] Japanese Patent Application Laid-Open Publication No. 2001-016620
[Patent document 5] Japanese Patent Application Laid-Open Publication No. H09-224267
[Patent document 6] Japanese Patent Application Laid-Open Publication No. 2010-206774

SUMMARY

In a stereoscopic picture, if a ratio of a distance from a camera to a physical object on this side (closer to the camera in a depthwise direction) to a distance from a camera to a backface is approximate to "1", even the stereoscopic picture becomes a planar picture with none of the stereoscopic sense. Moreover, in a plurality of objects (physical objects) within the picture, if there is no difference between the distances from the camera, even the stereoscopic picture becomes the planar picture exhibiting no stereoscopic sense. The stereoscopic picture is, however, requested to emphasize the stereoscopic sense even when there is no difference between the distances from the camera to the plurality of objects (physical objects).

According to one aspect of the disclosure, a stereoscopic picture generating apparatus includes:
a storage unit to get stored with a first image containing a plurality of partial images and a second image containing a plurality of partial images corresponding respectively to the plurality of partial images contained in the first image; and
an arithmetic unit to extract a first position defined as an existing position of a first partial image contained in the first image and a second position defined as an existing position of a second partial image contained in the first image, to calculate a first differential quantity defined as a difference between the first position and the second position, to calculate a third position defined as a new existing position of a third partial image contained in the second image that corresponds to the first partial image on the basis of the first differential quantity, and to generate a third image on the basis of the third position of the third partial image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 8 is a diagram illustrating an example of parallax phase angle information.
FIG. 10 is a diagram depicting an example of the coordinates of the reference object, the coordinates of another object in the image for the left eye and the coordinates of another object in the image for the right eye after a process in step S110.

DESCRIPTION OF EMBODIMENTS

Embodiments will hereinafter be described with reference to the drawings. Configurations of the embodiments are exemplifications, and the present invention is not limited to the configurations of the embodiments of the disclosure.

Herein, the discussion is made by using a stereoscopic picture based on images captured by two adjacent cameras, however, the stereoscopic picture is not limited to this type of images but may be based on two frames of artificially generated images, and so on. Moreover, the stereoscopic picture may also be a stereoscopic moving picture.

[First Embodiment]

(Parallax)

Figure 1:
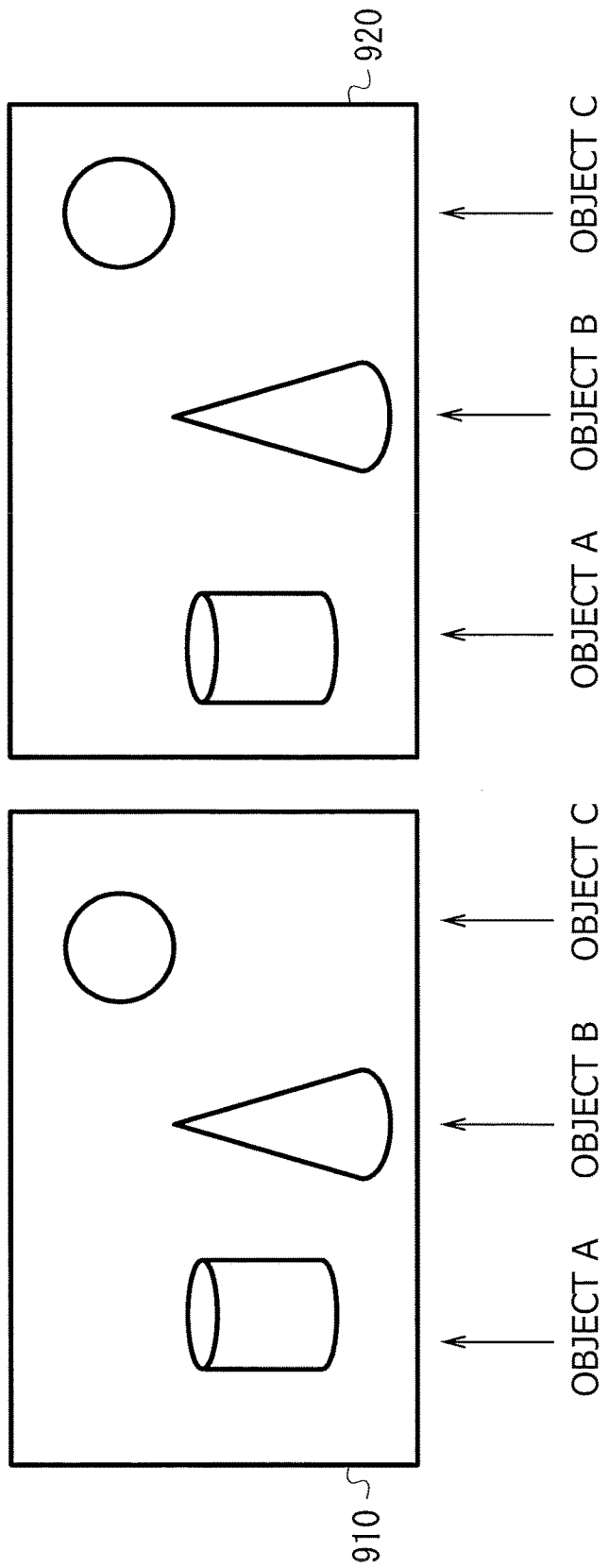
FIG. 1 is a diagram illustrating an example of a stereoscopic picture.
Figure 2:
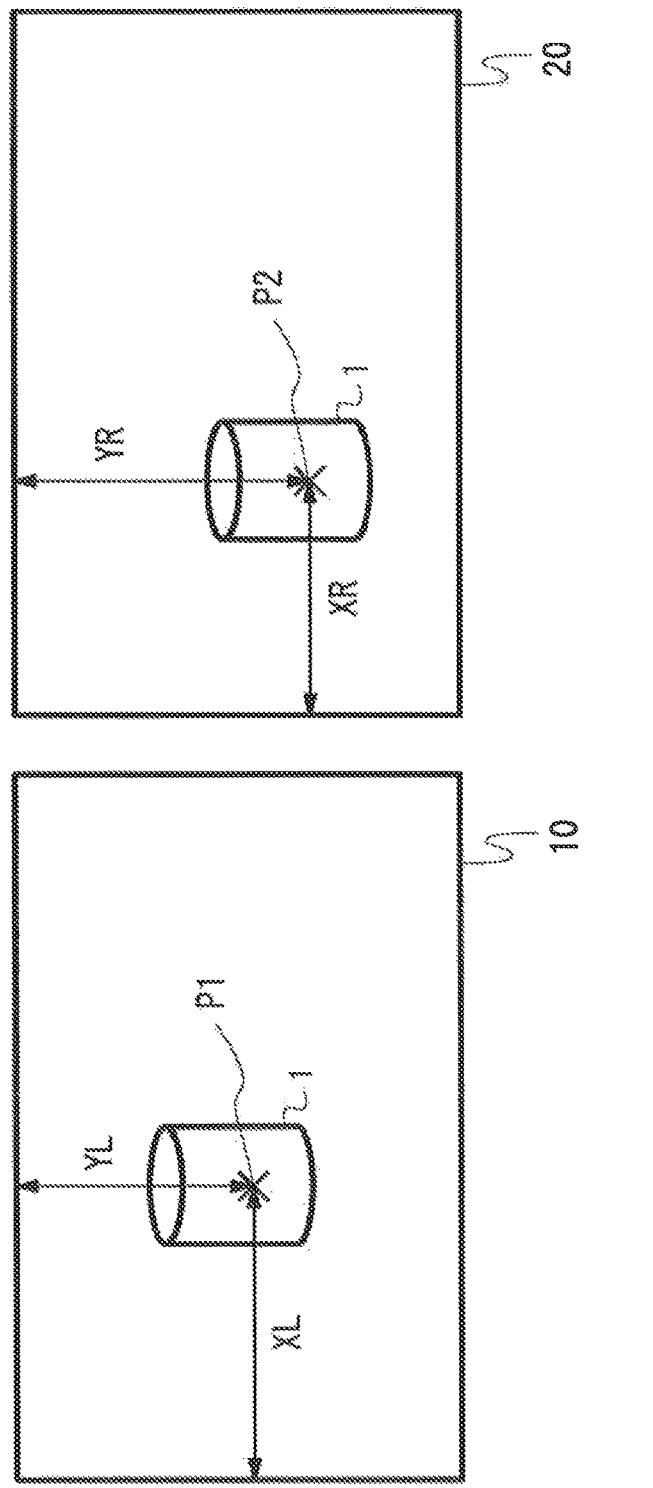
FIG. 2 is an explanatory diagram of a parallax in the stereoscopic picture.

FIG. 2 is an explanatory diagram illustrating a parallax in the stereoscopic picture. In FIG. 2, for instance, in images of the same physical object captured by the two adjacent cameras, an image 10 is defined as an image for a left eye, while an image 20 is defined as an image for a right eye. In the example of FIG. 2, the image 10 and the image 20 contain an object 1 defined as the same physical object. Herein, a point P1 is set as a point representative of a position of the object 1 in the image 10. A point P2 is set as a point representative of a position of the object 1 in the image 20. The point representative of the position of the object 1 may be set to, e.g., a central point of the object 1 and also a point located at a rightward lower edge of the object 1. The point representative of the position of the object 1 is not limited to these points. The point P1 and the point P2 are points each indicating the same position of the object 1. The point P1 and the point P2 are also referred to as the position of the object 1 in the image 10 and as the position of the object 1 in the image 20, respectively.

The parallax in the stereoscopic picture is a difference between the position in the image for the left eye and the position in the image for the right eye with respect to the same physical object. A parallax quantity is a magnitude of the parallax.

In the image 10 and the image 20 of FIG. 2, the parallax quantity of the object 1 is a difference between the position (point P1) of the object 1 in the image 10 and the position (point P2) of the object 1 in the image 20. To be specific, let (XL, YL) be a coordinate of the point P1 in the image 10 and (XR, YR) be a coordinate of the point P2 in the image 20, and the parallax quantity of the object 1 is expressed as follows.

$$\Delta X = XL - XR$$

$$\Delta Y = YL - YR \quad \text{[Mathematical Expression 1]}$$

Herein, $\Delta X$ represents the parallax quantity in a crosswise direction, and $\Delta Y$ denotes the parallax quantity in a lengthwise direction.

For example, the parallax of the object 1 in the stereoscopic picture disappears by moving the image for the right eye in parallel to a degree corresponding to this parallax quantity.

(Configuration)

Figure 3:
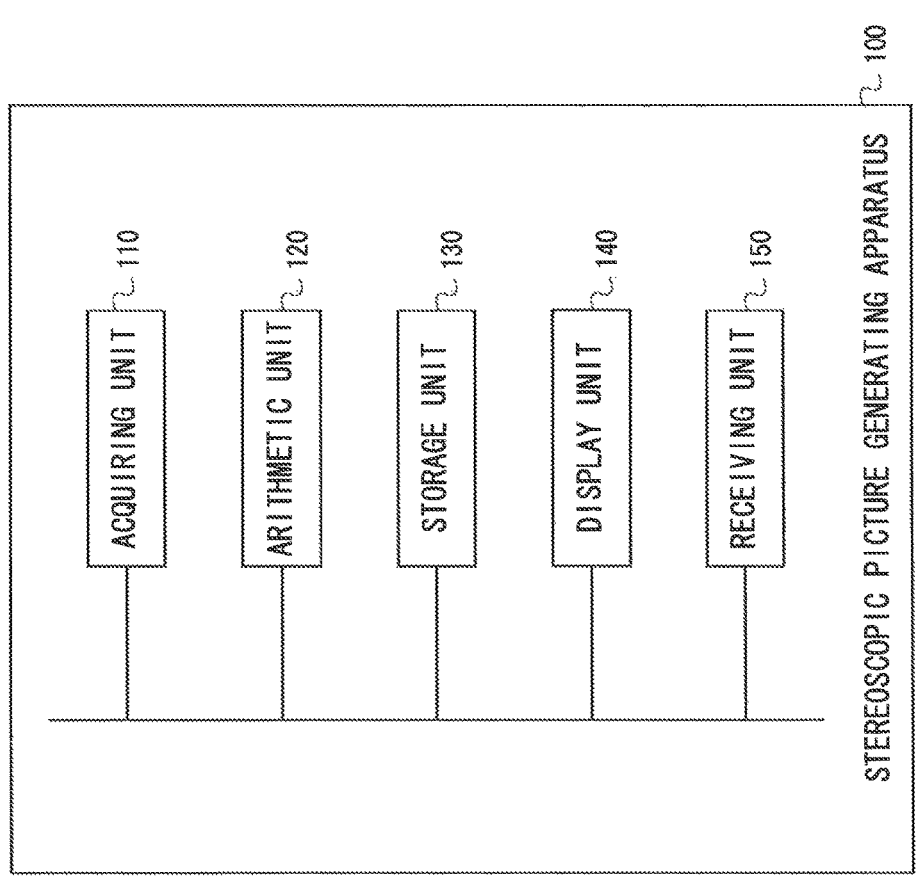
FIG. 3 is a diagram depicting an example of a stereoscopic picture generating apparatus.

FIG. 3 is a diagram illustrating an example of a stereoscopic picture generating apparatus. A stereoscopic picture generating apparatus 100 includes an acquiring unit 110, an arithmetic unit 120 and a storage unit 130.

The acquiring unit 110 acquires the images from an external or internal input device. The images acquired by the acquiring unit 110 are the image for the left eye and the image for the right eye in the stereoscopic picture. The images acquired by the acquiring unit 110 are stored in the storage unit 130.

The image for the left eye and the image for the right eye are stored in the storage unit 130 in the way of being associated with each other. Each image has a pixel value per dot within the image. The pixel value is information representing a color etc of the dot. The pixel values are expressed by, e.g., an R (Red) value, a G (Green) value and a B (Blue) value of RGB color coordinate system. As a substitute for the RGB color coordinate system, parameters (values) of other color coordinate systems (e.g., a YUV color coordinate system) may also be employed. In the case of using the parameters of the YUV color coordinate system, a Y (Yellow) value may be used as a luminance value.

The arithmetic unit 120 calculates the parallax quantity with respect to the images acquired by the acquiring unit 110, thereby generating the stereoscopic picture. The stereoscopic picture generated by the arithmetic unit 120 is stored in the storage unit 130.

The storage unit 130 gets stored with the images acquired by the acquiring unit 110, the stereoscopic picture generated by the arithmetic unit 120, the parallax quantity calculated by the arithmetic unit 120, an offset quantity predetermined with respect to the stereoscopic picture to be generated, and so on.

A display unit 140 displays the images etc stored in the storage unit 130.

A receiving unit 150 accepts an input such as a selection of the reference object from a user.

Figure 4:
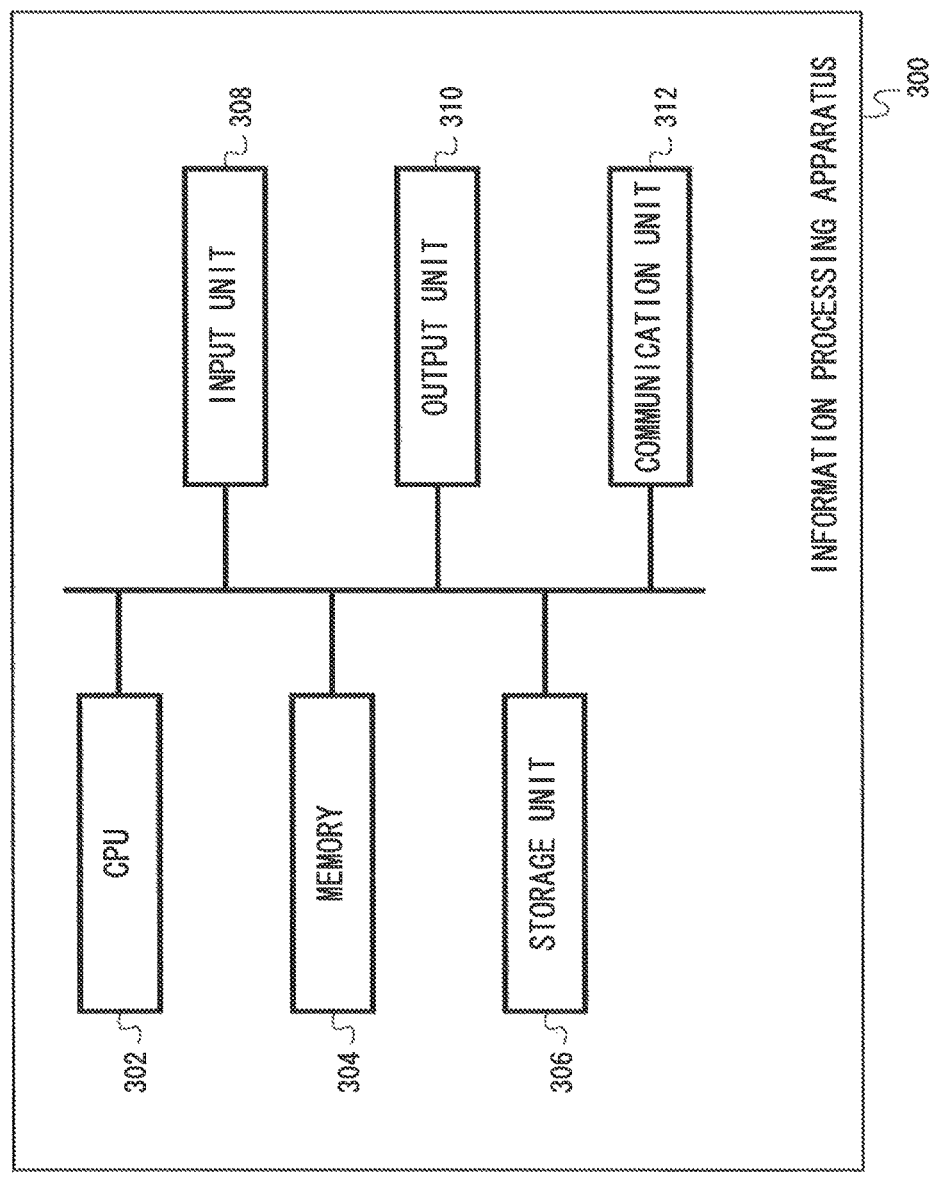
FIG. 4 is a diagram illustrating an example of a hardware configuration of an information processing apparatus.

FIG. 4 is a diagram illustrating an example of a hardware configuration of an information processing apparatus 300. The stereoscopic picture generating apparatus 100 is realized by, e.g., the information processing apparatus 300 as depicted in FIG. 4. The information processing apparatus 300 includes a CPU (Central Processing Unit) 302, a memory 304, a storing unit 306, an input unit 308, an output unit 310 and a communication unit 312.

The CPU 302 loads a program stored in a recording unit 306 into an operation area of a memory 304 and executes this program, whereby the information processing apparatus 300 can actualize functions conforming to predetermined purposes by controlling peripheral devices through the execution of the program.

The CPU 302 performs processes according to the program stored in the storing unit 306. The memory 304 caches the program and the data and also deploys the operation area. The memory 304 includes, e.g., a RAM (Random Access Memory) and a ROM (Read Only Memory).

The storing unit 306 stores various categories of programs and various items of data on a readable/writable recording medium. The storing unit 306 is exemplified by a solid-state drive device, a hard disk drive device, a CD (Compact Disc) drive device, a DVD (Digital Versatile Disc) drive device, a +R/+RW drive device, an HD DVD (High-Definition Digital Versatile Disc) drive device or a BD (Blu-ray Disc) drive device. Furthermore, the recording medium is exemplified by a silicon disk including a nonvolatile semiconductor memory (flash memory), a hard disk, a CD, a DVD, a +R/+RW, an HD DVD or a BD. The CD is exemplified by a CD-R (Recordable), a CD-RW (Rewritable) and a CD-ROM. The DVD is exemplified by a DVD-R and a DVD-RAM (Random Access Memory). The BD is exemplified by a BD-R, a BD-RE (Rewritable) and BD-ROM.

The input unit 308 accepts an operating instruction etc from the user etc. The input unit 308 is exemplified by input devices such as a keyboard, a pointing device, a wireless remote controller, a microphone and a plurality of cameras. The CPU 302 is notified of information inputted from the input unit 308. The camera may be equipped with an infrared-ray sensor etc for measuring a distance.

The output unit 310 outputs the data processed by the CPU 302 and the data stored in the memory 304. The output unit 310 is exemplified by output devices such as a CRT (Cathode Ray Tube) display, an LCD (Liquid Crystal Display, a PDP (Plasma Display Panel), an EL (Electroluminescence) panel, a printer and a loudspeaker.

The communication unit 312 transmits and receives the data to and from the external device. The communication unit 312 is connected to the external device via, e.g., a signal line. The communication unit 312 is exemplified such as a LAN (Local Area Network) interface board and a wireless communication circuit for wireless communications.

In the information processing apparatus 300, the storing unit 306 is stored with an operating system (OS), the various categories of programs and a variety of tables.

The OS is software that handles in-between operations between the software components and the hardware components, manages a memory space, manages files and manages processes and tasks. The OS includes a communication interface. The communication interface is defined as a program for transferring and receiving the data to and from another external device etc connected via the communication unit 312.

The information processing apparatus 300 capable of realizing the stereoscopic picture generating apparatus 100 actualizes functions as the acquiring unit 110, the arithmetic unit 120 and the receiving unit 150 in such a way that the CPU 302 loads the programs stored in the storing unit 306 into the memory 304 and executes the programs. Further, the storage unit 130 is provided in storage areas of the memory 304, the storing unit 306, etc. The display unit 140 is realized by the CPU 302, the output unit 310, etc. The receiving unit 150 is realized by the CPU 302, the input unit 308 and so on.

Operational Example

An operational example of the stereoscopic picture generating apparatus 100 will be described. In the following discussion, the left and the right are employed, however, there is neither superiority nor inferiority between the left eye and the right, and the both are interchangeable. For example, in the following discussion, the image for the left eye and the image for the right eye are used, however, there is neither superiority nor inferiority between the image for the left eye and the image for the right eye, and the both are interchangeable.

The stereoscopic picture generating apparatus 100 acquires the image for the left eye and the image for the right eye, and settles objects contained in the images. Further, the stereoscopic picture generating apparatus 100 determines a reference object, and calculates the parallax quantities of other objects on the basis of a positional relation between each of these other objects and the reference object and phase angles of the parallaxes. The stereoscopic picture generating apparatus 100 determines the parallax quantity of each object so that the parallax quantity of each object does not exceed a limit value of the parallax quantity.

Figure 5:
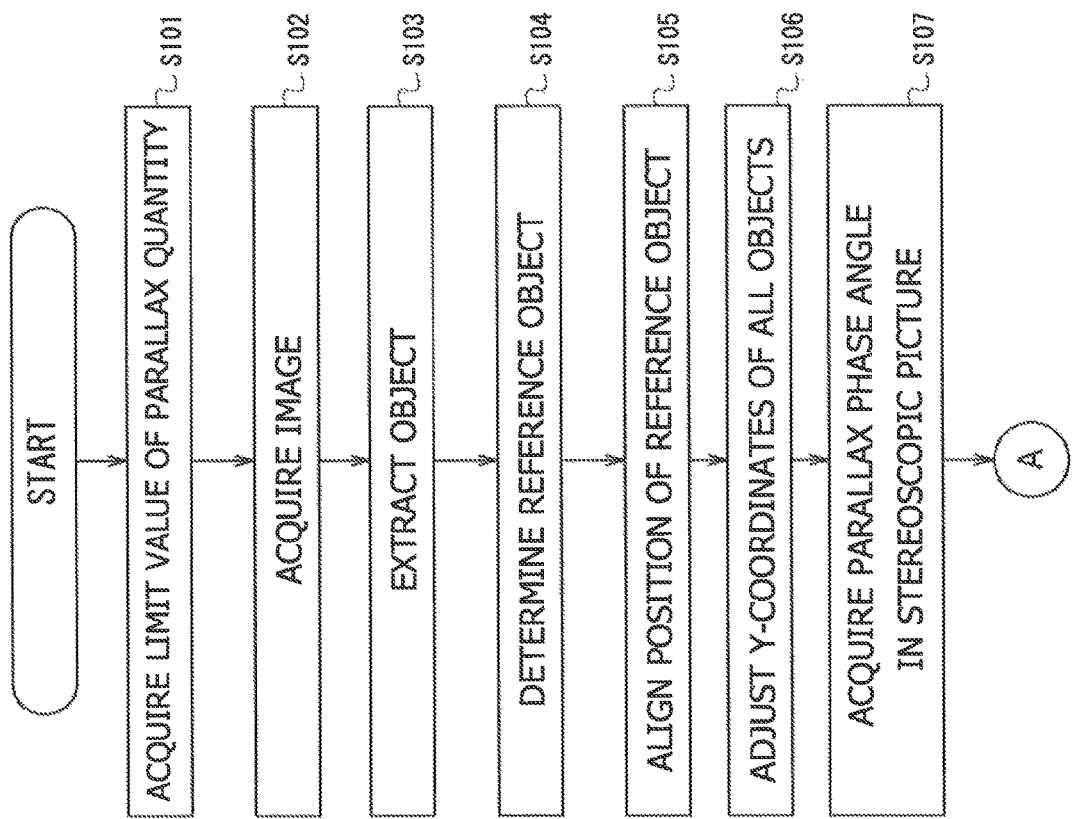
FIG. 5 is a flowchart illustrating an example (1) of an operation flow of the stereoscopic picture generating apparatus.
Figure 6:
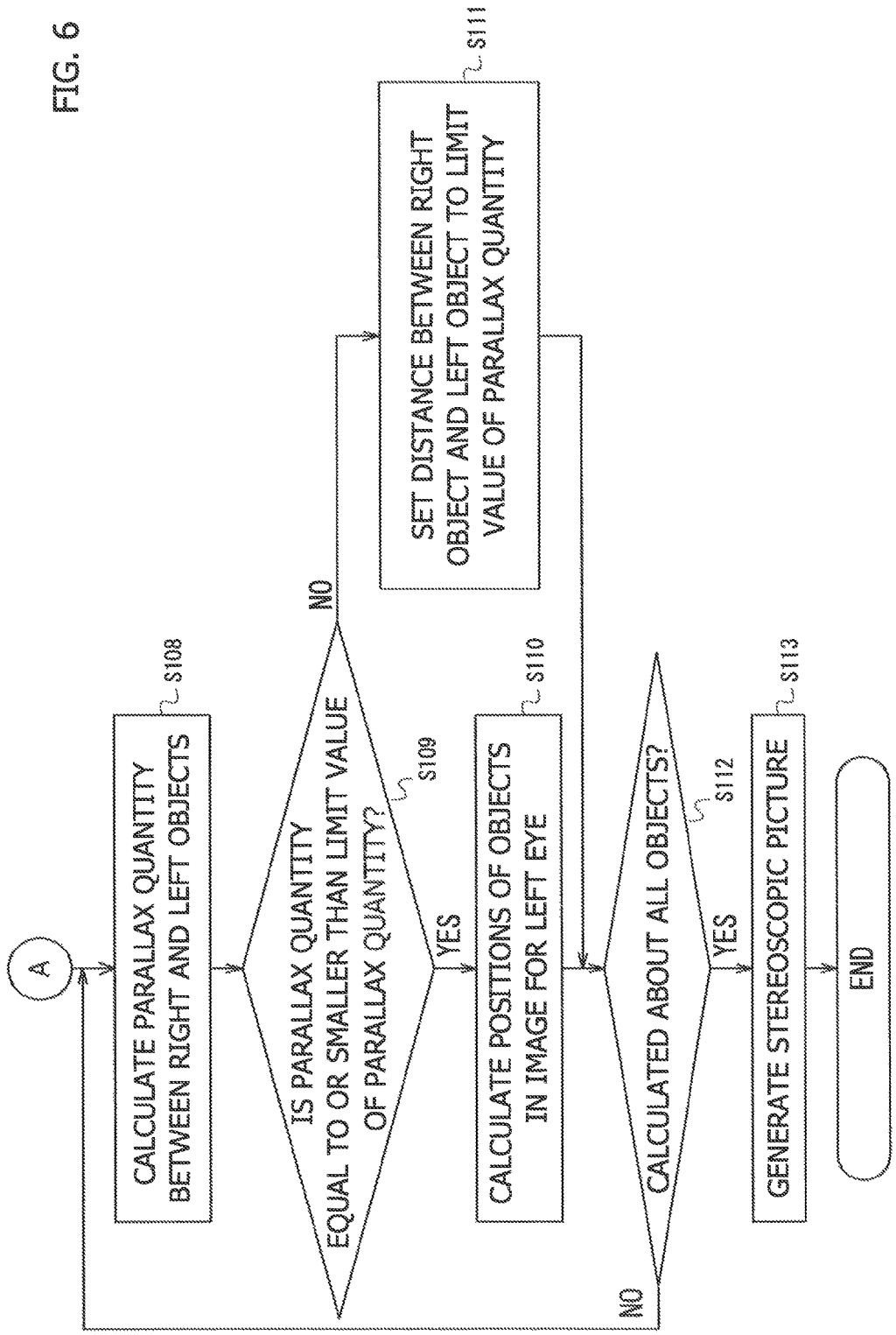
FIG. 6 is a flowchart illustrating an example (2 of the operation flow of the stereoscopic picture generating apparatus.

FIGS. 5 and 6 are flowcharts illustrating an example of an operation flow of the stereoscopic picture generating apparatus 100. A symbol [A] in FIG. 5 is continued to [A] in FIG. 6. Symbols [B] and [C] in FIG. 8 connect to [B] and [C] in FIG. 9. A start of the operation flow in FIGS. 5 and 6 is triggered by, e.g., powering ON the stereoscopic picture generating apparatus 100.

The arithmetic unit 120 of the stereoscopic picture generating apparatus 100 acquires the limit value of the parallax quantity (S101). The limit value of the parallax quantity is stored in e.g., the storage unit 130. The limit value of the parallax quantity is defined as a maximum value of the parallax quantity of the same physical object between the image for the left eye and the image for the right eye. The limit value of the parallax quantity is set by use of a pixel count (the number of pixels). The limit value of the parallax quantity is a quantity depending on a size of the display unit 140, the pixel count, etc. If there is a parallax quantity exceeding the limit value of the parallax quantity with respect to the same physical object, such a possibility exists that a person cannot recognize the same physical object. The limit value of the parallax quantity depends on the size of the display unit 140. For instance, the limit value of the parallax quantity is set so that a length in the display unit 140 becomes equal to or smaller than an interval between human eyes. Accordingly, in the case of comparing the display units 140 having the same pixel count with each other, the display unit 140 having a larger size of screen exhibits a smaller limit value of the parallax quantity. The arithmetic unit 120 of the stereoscopic picture generating apparatus 100 may also calculate the limit value of the parallax quantity on the basis of the size and the pixel count of the display unit 140, which are stored in the storage unit. Moreover, the arithmetic unit 120 of the stereoscopic picture generating apparatus 100 may also prompt a user to input the limit value of the parallax quantity to the accepting unit 150.

The acquiring unit 110 acquires the image for the left eye and the image for the right eye (S102). The acquiring unit 110 may acquire the image for the left eye and the image for the right eye from a built-in camera of the stereoscopic picture generating apparatus 100, may also acquire these images from the external device. The acquired images for the left and right eyes are stored in the storage unit 130. The image for the left eye and the image for the right eye may also be stored previously in the storage unit 130.

The arithmetic unit 120 extracts all the objects (physical objects) contained in common to the image for the left eye and the image for the right eye, which are acquired in step S102 (S103). The extraction of the common objects involves using, e.g., pattern matching. The arithmetic unit 120 stores, in the storage unit 130, positions of the respective images (the image for the left eye and the image for the right eye) of the common physical objects (objects). Further, the arithmetic unit 120 stores the images of the common objects in the storage unit 130. The object (physical object) in the image for the left eye (or the image for the right eye) is also referred to as a partial image.

The pattern matching is conducted, e.g., in a manner described below. The arithmetic unit 120 superposes a moving image in the image for the left eye on a moving image in the image for the right eye in a certain position, and takes a difference between pixel values in the superposed region. The arithmetic unit 120 obtains a position and a size of an area with the difference being "0" in the superposed region. The position of this area can be set to a central position of the region of each image. Further, the arithmetic unit 120 similarly takes the difference of the superposed region in each of the positions by arbitrarily moving the superposed position in parallel, and obtains the position and the size of the area with the difference being "0" in the superposed region. The arithmetic unit 120 extracts the area having the largest size with the difference being "0". The arithmetic unit 120 can deem the area having the largest size with the difference being "0" (the area with the difference being "0") as the common physical object and the position of the area (the area with the difference being "0") as the position of the moving object. This area can be considered to be the same object in the same form in the image for the left eye and the image for the right eye. Note that the pattern matching method is not limited to the method described above, but other known methods are applicable. These common physical objects are recognized by the user who views the stereoscopic picture as the same object in the stereoscopic picture.

Herein, the images (which are referred to as predetermined images) of the common physical objects may be stored beforehand in the storage unit 130. At this time, the arithmetic unit 120 may extract the common physical objects by performing the pattern matching of the image for the left eye and the image for the right eye with the predetermined images stored in the storage unit 130. Moreover, the images of the once-extracted common physical objects may also be stored as the predetermined images in the storage unit 130.

The arithmetic unit 120 determines the reference object from within the objects extracted in step S103 (S104). The reference object can be set to the image closest to the center (middle) of, e.g., the image for the right eye. Further, the arithmetic unit 120 displays the image for the right eye on the display unit 140 and may prompt the user to select a range serving as the reference object. The user selects the range serving as the reference object from the image displayed on the display unit 140, and may input the selected range through the accepting unit 150. The arithmetic unit 120 extracts the image of the selected range and stores the extracted image as the reference object in the storage unit 130. This operation enables the arithmetic unit 120 to specify the reference object. Moreover, the image serving as the reference object may also be stored previously in the storage unit 130. The range of the reference object may also be selected in each of the image for the left eye and the image for the right eye. At this time, the user selects the range of the reference object about the same physical object with respect to the image for the left eye and the image for the right eye. The reference object is one example of a predetermined image.

The arithmetic unit 120 calculates the parallax quantity between the image for the left eye and the image for the right eye with respect to the reference object determined in step S104. Herein, the arithmetic unit 120 obtains the position of the reference object in the image for the left eye. Further, the arithmetic unit 120 obtains the position of the reference object in the image for the right eye. The position of the reference object in the image is specified by, e.g., coordinates of the center of the reference object. The reference objects of the image for the left eye and the image for the right eye have been determined in step S104.

The arithmetic unit 120 calculates a difference between the position of the reference object in the image for the left eye and the position of the reference object in the image for the right eye. The thus-obtained difference is the parallax quantity. In the obtained difference, the difference given in the crosswise direction is a parallax quantity $\Delta X$, while the difference given in the lengthwise direction is a parallax quantity $\Delta Y$. The arithmetic unit 120 stores the parallax quantity $\Delta X$ in the crosswise direction and the parallax quantity $\Delta Y$ in the lengthwise direction in the storage unit 130.

Further, the arithmetic unit 120 may obtain the parallax quantity by superposing the image for the left eye and the image for the right eye on each other and moving one image (e.g., the image for the right eye) in parallel so that the range of the reference object specified in step S104 becomes coincident with the image for the left eye and the image for the right eye. The parallax quantity is equivalent to a distance (a moving quantity in an X-axis direction and a moving quantity in a Y-axis direction) at which one image (e.g., the image for the right eye) moves in parallel). At this time, the arithmetic unit 120 stores, with respect to the distance given when moved in parallel, the distance in the crosswise direction as the parallax quantity $\Delta X$ and the distance in the lengthwise direction as the parallax quantity $\Delta Y$ in the storage unit 130. The parallax quantity contains positive and negative signs. That is, for instance, in the case of making the parallel movement in a $-X$ direction, the parallax quantity $\Delta X$ takes a negative quantity.

Moreover, the arithmetic unit 120 may also obtain the parallax quantity as below. The arithmetic unit 120 displays the image for the left eye and the image for the right eye in superposition on the display unit 140. The user moves one image in parallel with the aid of the accepting unit 150 while looking at the images displayed on the display unit 140 so that the range of the reference object specified in step S102 becomes coincident with the image for the left eye and the image for the right eye. The parallax quantity is the distance given when one image (e.g., the image for the right eye) moves in parallel. The arithmetic unit 120 stores, with respect to the distance given when moved in parallel, the distance in the crosswise direction as the parallax quantity $\Delta X$ and the distance in the lengthwise direction as the parallax quantity $\Delta Y$ in the storage unit 130.

The arithmetic unit 120 aligns the positions of the reference objects in the image for the left eye and the image for the right eye (S105). In the process of S105, the arithmetic unit 120 extracts, e.g., the image for the right eye from the storage unit 130. Then, the arithmetic unit 120 sets an image, which is given by moving the whole image for the right eye in parallel by the parallax quantity, as a new image for the right eye. The parallax quantities involve using the parallax quantities ($\Delta X$ and $\Delta Y$) stored in the storage unit 130. Thus, when moving the whole image of the image for the right eye in parallel by the parallax quantities ($\Delta X$ and $\Delta Y$) obtained beforehand, the position of the reference object in the image for the right eye becomes coincident with the position of the reference object in the image for the left eye. Namely, the parallax of the reference object between the image for the left eye and the image for the right eye substantially disappears. The arithmetic unit 120 stores the new image for the right eye in the storage unit 130. Furthermore, the arithmetic unit 120 moves the position of the image for the right eye, which is stored in the storage unit 130, in parallel by the parallax quantities ($\Delta X$ and $\Delta Y$), and sets this parallel-moved position as a new position of the object of the image for the right eye.

The arithmetic unit 120 adjusts Y-coordinates of all the objects in the image for the left eye and the image for the right eye (S106). In the process of S106, the arithmetic unit 120 makes the Y-coordinates of all the objects in the image for the left eye coincident with the Y-coordinates of all the objects in the image for the right eye. This is because, if the Y-coordinates of the same object in the image for the left eye differ from the Y-coordinates thereof in the image for the right eye, there is a possibility that the object might not be recognized to be identical. The arithmetic unit 120 extracts the image for the left eye and the image for the right eye from the storage unit 130. Further, the arithmetic unit 120 extracts, with respect to all the objects, the positions of the objects in the image for the left eye and the positions of the objects in the image for right eye from the storage unit 130. The arithmetic unit 120 compares the Y-coordinates of each object. The arithmetic unit 120, if the same object has a difference of the Y-coordinates between the image for the left eye and the image for the right eye, adjusts the Y-coordinates in the image for the right eye to the Y-coordinates in the image for the left eye. Moreover, the arithmetic unit 120 may apply, with respect to the same object, an average of the Y-coordinates in the image for the left eye and the Y-coordinates in the image for the right eye to the Y-coordinates in the image for the left eye and the Y-coordinates in the image for the right eye. With this contrivance, the Y-coordinates in the image of the object for the left eye is identical to the Y-coordinates in the image of the object for the right eye. The arithmetic unit 120 stores the new image for the left eye (and the new image for the right eye) in the storage unit 130. Further, the arithmetic unit 120 stores the position of each of objects in the new image for the left eye and the position of each of objects in the new image for the right eye in the storage unit 130. The new image for the left eye and the new image for the right eye are used in the subsequent processes.

Figure 7:
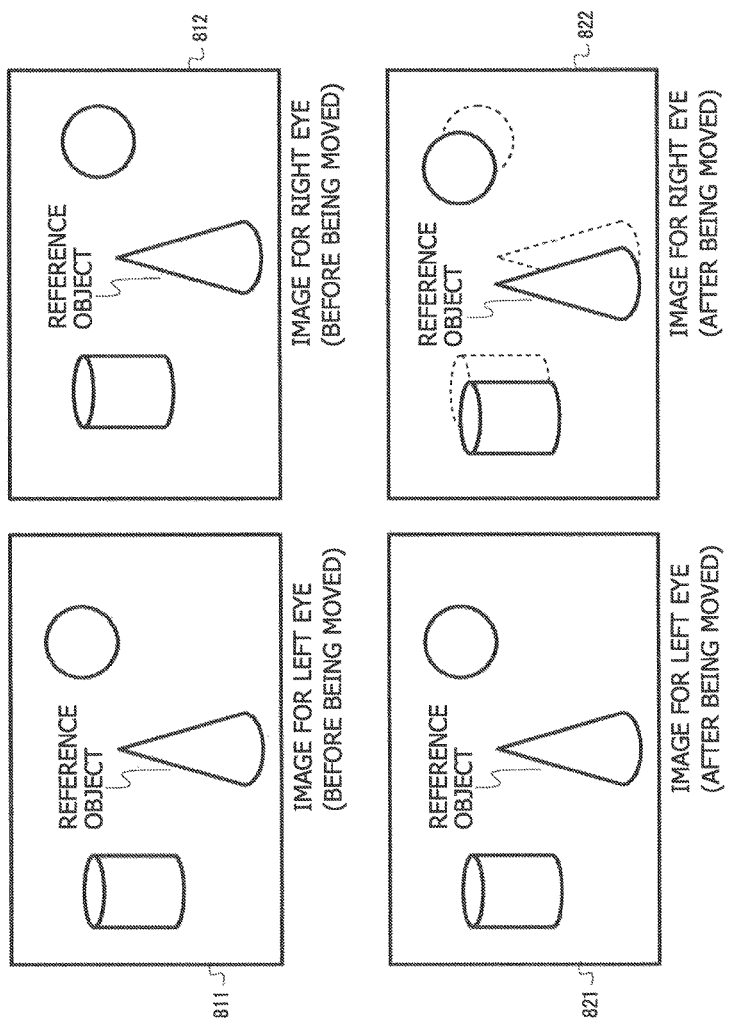
FIG. 7 is a diagram depicting a concrete example of processes in step S105 and step S106.

FIG. 7 is a diagram illustrating a concrete example of the processes in step S105 and step S106. An image 811 for the left eye and an image 812 for the right eye correspond to the image for the left eye and the image for the right eye before being processed in step S105 and step S106. Moreover, an image 821 for the left eye and an image 822 for the right eye correspond to the image for the left eye and the image for the right eye after being processed in step S105 and step S106. Herein, the image for the left eye is fixed, while the image for the right eye is moved, whereby the processes in step S105 and step S106 are carried out. In step S105, the position of the reference object of the image 812 for the right eye is moved to get coincident with the position of the reference object of the image 811 for the left eye. In step S106, the Y-coordinates of all the objects of the image for the right eye are moved to become coincident with the Y-coordinates of the corresponding objects of the image 811 for the left eye. The objects depicted by solid lines in the image 822 for the right eye represent objects after being moved. Moreover, the objects depicted by dotted lines in the image 822 for the right eye represent objects before being moved. Herein, the image for the left eye is fixed, and hence the image 811 for the left eye is identical with the image 821 for the left eye.

Referring back to FIG. 5, the arithmetic unit 120 acquires parallax phase angle information in the stereoscopic picture (S107). The parallax phase angle is a quantity used when calculating the new position of the object of the image for the left eye. The parallax phase angle is a quantity depending on a distance between the position of the reference object and the position of another object in the image for the right eye. The parallax phase angle may also be a quantity depending on a difference between the Y-coordinates of the reference object and the Y-coordinates of another object in the image for the right eye. The parallax phase angle is an angle made by a straight line extending from the position of the reference object to the position of another object in the image for the right eye and by a straight line extending therefrom to the position of another object in the image for the left eye when the image for the left eye and the image for the right eye are expressed on the same screen. In the subsequent processes, the position of another object in the image for the left eye is calculated in a way that fixes the position of the reference object and the position of another object in the image for the right eye.

FIG. 8 is a diagram illustrating an example of the parallax phase angle information. FIG. 8 illustrates an example of a table depicting an associative relation between the distance between the position of the reference object and the position of another object in the image for the right eye and the parallax phase angle. This table is stored in, e.g., the storage unit 130. At this time, the arithmetic unit 120 can acquire the parallax phase angle information from the storage unit 130. Moreover, the parallax phase angle may also be given as a function of the distance between the position of the reference object and the position of another object in the image for the right eye.

The user may adjust the associative relation between the distance between the position of the reference object and the position of another object in the image for the right eye and the parallax phase angle. For example, the associative relation may also be adjusted in a way that multiplies a value of the parallax phase angle in the table of FIG. 8 by an arbitrary value. For instance, the arithmetic unit 120 may prompt the user to input this value. The user can adjust the parallax phase angle by inputting the value through the accepting unit 150. Further, the parallax phase angle may also be adjusted by other methods. The parallax phase angle is adjusted, whereby a stereoscopic sense in the stereoscopic picture is adjusted. For example, the stereoscopic sense in the stereoscopic picture is emphasized by increasing the parallax phase angle. Namely, the parallax phase angle is adjusted, thereby further emphasizing or de-emphasizing the stereoscopic sense in the stereoscopic picture.

The arithmetic unit 120 acquires the parallax phase angle information defined as the associative relation between the distance between the position of the reference object and the position of another object in the image for the right eye and the parallax phase angle from the table as in FIG. 8, through the user's input and by the function.

In step S108, the arithmetic unit 120 calculates the parallax quantity defined as the difference between the position of one object in the image for the left eye and the position of this object in the image for the right eye (S108). The arithmetic unit 120 extracts information on the position of a certain single object in the image for the left eye and information on the position of this object in the image for the right eye from the storage unit 130. Herein, owing to the process in step S106, the Y-coordinates of one object in the image for the left eye are the same as the Y-coordinates thereof in the image for the right eye. Hence, the parallax quantity is calculated based on a difference between X-coordinates in the image for the left eye and X-coordinates in the image for the right eye.

Figure 9:
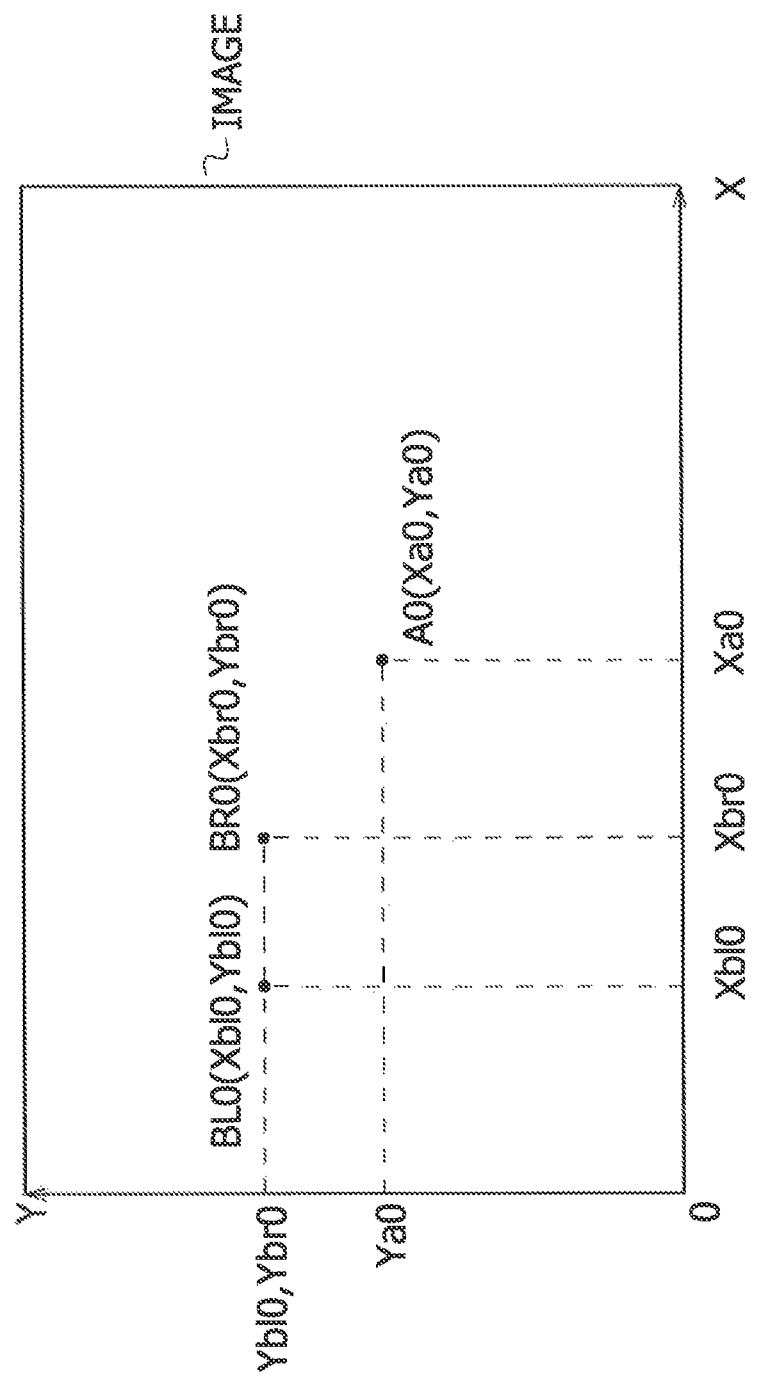
FIG. 9 is a diagram depicting an example of coordinates of a reference object, coordinates of another object in an image for a left eye and coordinates of another object in an image for a right eye.

FIG. 9 is a diagram illustrating an example of the coordinates of the reference object, the coordinates of another object in the image for the left eye and the coordinates thereof in the image for the right eye. In the example of FIG. 9, the coordinates of the reference object are indicated by a point A0 (Xa0, Ya0). Further, the coordinates of another object in the image for the left eye are indicated by a point BL0 (Xbl0, Ybl0), and the coordinates thereof in the image for the right eye are indicated by a point BR0 (Xbr0, Ybr0). Herein, the Y-coordinate of the point BL0 is the same as the Y-coordinate of the point BR0 owing to the process in step S106. Moreover, the parallax quantity is a difference between the X-coordinate of the point BL0 and the X-coordinate of the point BR0.

Referring back to FIG. 6, the arithmetic unit 120 checks whether or not the parallax quantity of the object that is processed in step S108 is equal to or smaller than the limit value of the parallax quantity that is acquired in step S101

(S109). If the parallax quantity of the object exceeds the limit value of the parallax quantity, such a possibility exists that the user, who views the stereoscopic picture, cannot recognize this object as one object (physical object). Therefore, the arithmetic unit 120 checks whether the parallax quantity of the object is equal to or smaller than the limit value of the parallax quantity or not.

If the parallax quantity of the object is equal to or smaller than the limit value of the parallax quantity that is acquired in step S101 (S109; YES), the arithmetic unit 120 calculates a new position of the object in the image for the left eye (S110). The arithmetic unit 120 calculates, based on the following formula, a new position (a point BL1 (Xbl1, Ybl1)) of the object in the image for the left eye.

$$L_1{}^2 = L_2{}^2 + L_3{}^2 + 2 \cdot L_2 \cdot L_3 \cdot \cos\theta_0 \quad \text{[Mathematical Expression 2]}$$

$$L_1 = \sqrt{(Xbl1-Xbr0)^2 + (Ybl1-Ybr0)^2} = \sqrt{(Xbl1-Xbr0)^2} \because Ybl1 = Ybr0$$

$$L_2 = \sqrt{(Xbr0-Xa0)^2 + (Ybr0-Ya0)^2}$$

$$L_3 = \sqrt{(Xbl1-Xa0)^2 + (Ybl1-Ya0)^2} = \sqrt{(Xbl1-Xa0)^2} \because (Ybl1=Ya0)$$

An angle $\theta_0$ is the parallax phase angle based on the parallax phase angle information acquired in step S107. The parallax phase angle depends on a distance between, e.g., the point A0 and the point BR0.

Herein, the angle $\theta_0$, the coordinates of the point A0 and the coordinates of the point BR0 take given values. The Y-coordinate (Ybl1) of the point BL1 shall be the same as the Y-coordinate (Ybl10) of the point BR0. Hence, the formula given above is a quadratic equation with respect to the X-coordinate (Xbl1) of the point BL1, and hence the X-coordinate (Xbl1) of the point BL1 is obtained. When solving the quadratic equation, two solutions for Xbl1 are obtained, however, there is taken the solution by which the sign (the positive sign or the negative sign) of (Xbl0−Xbr0) is identical with the sign of (Xbl1−Xbr0). Namely, the solution of Xbl1 involves adopting Xbl1 with which a product of (Xbl0−Xbr0) and (Xbl1−Xbr0) is positive. The arithmetic unit 120 thus calculates the point BL1 (Xbl1, Ybl1). If the difference (parallax quantity) between the point BL1 and the point BR1 exceeds the limit value of the parallax quantity, the arithmetic unit 120 does not, however, adopt the value calculated herein as the point BL1. In this case, the new position (the point BL1 (Xbl1, Ybl1)) of the object in the image for the left eye shall be a position moved by the limit value of the parallax quantity toward the point BL0 from the position (the point BR0(Xbr0,Ybr0)) of the object in the image for the right eye. Further, if the Y-coordinates of the point A0 are the same as the Y-coordinates of the point BR0, the arithmetic unit 120 shall set the new position of the object to be coincident with the original position (the point BR0 and the point BL0). The arithmetic unit 120 stores information on the positions calculated herein in the storage unit 130. The method of calculating the position of the point BL1 is not limited to this method, but the position of the point BL1 may also be calculated by other calculation methods using a function of the distance between the reference object and the calculation target object.

FIG. 10 is a diagram illustrating an example of the coordinates of the reference object, the coordinates of another object in the image for the left eye and the coordinates thereof in the image for the right eye. In the example of FIG. 10, the coordinates of the reference object are indicated by a point A1 (Xa1,Ya1). The position of the point A1 is the same as the position of the point A0. Further, the coordinates of another object in the image for left eye are indicated by the point BL1 (Xbl1,Ybl1), and the coordinates of another object in the image for right eye are indicated by the point BR1 (Xbr1,Ybr1). The position of the point BR1 is the same as the position of the point BR0. The angle $\theta_0$ is the parallax phase angle. The angle $\theta_0$ is an angle made by the point BR1-the point A0-the point BL1 (made by a line segment A0-BR1 and by a line segment A0-BL1).

Referring back to FIG. 6, if the parallax quantity of the object is not equal to or smaller than the limit value of the parallax quantity acquired in step S101 (S109; NO), the arithmetic unit 120 calculates a new position of the object in the image for the left eye (S111). Herein, the new position (the point BL1 (Xbl1,Ybl1)) of the object in the image for the left eye becomes a position moved by the limit value of the parallax quantity toward the point BL0 from the position (the point BR0 (Xbr0,Ybr0)) of the object in the image for the right eye. The arithmetic unit 120 stores information on the position calculated herein in the storage unit 130.

The arithmetic unit 120 checks whether the new positions of all the objects are calculated or not (S112). If there are some objects of which the new positions are not yet calculated (S112; NO), the processing loops back to step S108, in which the objects with their new positions not yet being calculated, are processed. Whereas if the new positions of all the objects are calculated (S112; YES), the processing advances step S113.

In step S113, the arithmetic unit 120 generates the stereoscopic picture (S113). The arithmetic unit 120 lays out the respective objects in the image for the left eye and the image for the right eye on the basis of the positions of all the objects that are calculated in step S110 or step S111, and stores these objects as one (one set) stereoscopic picture in the storage unit 130. Moreover, the arithmetic unit 120 may also display the generated stereoscopic picture on the display unit 140.

The stereoscopic picture stored in the storage unit 130 can be displayed on a display device for a stereovision. The display device for the stereovision is a display device configured so that the image for the left eye is inputted to the left eye, while the image for the right eye is inputted to the right eye.

Herein, the processing of the stereoscopic picture generating apparatus 100 terminates. If the image for the left eye and the image for the right eye are consecutively inputted, however, the processing loops back to step S102 and is repeated. Further, if the image to be inputted is a moving picture, similarly the processing loops back to step S102 and is iterated.

Modified Example

The arithmetic unit 120 may calculate the position of the point BL1 on the basis of the following formula in place of calculating the position of the point BL1 in step S110.

$$Xbl1 = \alpha \cdot L_2 \cdot (Xbl0 - Xbr0) + Xbr0 \quad \text{[Mathematical Expression 3]}$$

$$L_2 = \sqrt{(Xbr0 - Xa0)^2 + (Ybr0 - Ya0)^2}$$

Herein, a value $\alpha$ is a constant. For example, the value $\alpha$ can be adjusted in place of prompting the user to adjust the parallax phase angle. The value $\alpha$ is adjusted, thereby enabling the stereoscopic sense in the stereoscopic picture to be adjusted. An increase in value $\alpha$ leads to a rise in parallax quantity, and hence the stereoscopic sense in the stereoscopic picture can be further emphasized. A difference (Ybr0−Ya0) between the Y-coordinates may also be used as a substitute for a distance $L_2$.

A value (Xbl0−Xbr0) is the parallax quantity of the object in step S110. The parallax quantity depends on the position (coordinates) in the depthwise direction (Z-direction). Let Zb be the position (coordinates) of the object in the Z-direction (a direction of an optical-axis of the camera) with the camera position serving as an origin, and the parallax quantity takes a linear to Zb to the power of −1 (Zb^(−1)). Namely, when the position of the object gets distanced from the camera (when Zb increases), the parallax quantity becomes approximate to a predetermined value. The Z-directional position Zb of the object can be calculated based on the parallax quantity. Moreover, the Z-directional position Zb of the object may also be obtained by, e.g., an infrared-ray sensor etc attached to the camera. The position of the point BL1 of the object may also be calculated based on the following formula by use of the Z-directional position Zb of the object.

$$Xbl1 = \left(\frac{\alpha \cdot L_2}{Zb} - \beta\right) + Xbr0$$

$$L_2 = \sqrt{(Xbr0 - Xa0)^2 + (Ybr0 - Ya0)^2}$$

[Mathematical Expression 4]

Herein, a value β is a constant. For instance, the parallax quantity ΔX in the crosswise direction, which is used in step S105, can take the value β. At this time, if the Z-directional position of the object is coincident with the Z-directional position of the reference object, the parallax quantity of this object is "0". A new parallax quantity of each object is calculated based on a difference from the Z-directional position of the reference object. The difference between the Z-directional position of the object and that of the reference object gets smaller, the new parallax quantity is affected to a greater degree. Further, the value β may also be "0".

Moreover, according to these formulae, the new parallax quantity of each object can take a value depending on a distance (a distance on the image) from the reference object and on the original parallax quantity or a value depending on the distance from the reference object and on Z-directional position of each object. According to this contrivance, it is feasible to generate a new stereoscopic picture depending on a back-and-forth relation (in the depthwise direction) of the original image.

Operation and Effect of Embodiment

The stereoscopic picture generating apparatus 100 acquires the image for the left eye and the image for the right eye, and settles the objects contained in the images. Further, the stereoscopic picture generating apparatus 100 determines the reference object, and calculates the parallax quantities of other objects on the basis of the positional relations between other objects and the reference object, the parallax phase angles, etc. Moreover, the stereoscopic picture generating apparatus 100 determines each object so as not to exceed the limit value of the parallax quantity.

The stereoscopic picture generating apparatus 100 is capable of generating the stereoscopic picture having the stereoscopic sense depending on the distance on the screen between the reference object and each object. Namely, the stereoscopic picture generating apparatus 100 can generate the stereoscopic picture emphasizing the stereoscopic sense of even the picture based on the plurality of objects with no difference between their distances from the camera.

[Non-transitory Computer Readable Recording Medium]

A program for making a computer, other machines and devices (which will hereinafter be referred to as the computer etc) realize any one of the functions can be recorded on a non-transitory recording medium readable by the computer etc. Then, the computer etc is made to read and execute the program on this non-transitory recording medium, whereby the function thereof can be provided.

Herein, the non-transitory computer-readable recording medium connotes a recording medium capable of accumulating information such as data and programs electrically, magnetically, optically, mechanically or by chemical action, which can be read from the computer. Such a medium is provided inside with components such as the CPU and the memory that configure the computer, in which the CPU may also be made to execute the program.

Further, among these recording mediums, for example, a flexible disc, a magneto-optic disc, a CD-ROM, a CD-R/W, a DVD, a DAT, an 8 mm tape, a memory card, etc. are given as those removable from the computer.

Furthermore, a hard disc, a ROM (Read-Only Memory), etc. are given as the recording mediums fixed within the computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A stereoscopic picture generating apparatus comprising:
    a memory configured to store a first image containing a plurality of partial images and a second image containing a plurality of partial images corresponding respectively to the plurality of partial images contained in the first image; and
    a processor coupled to the memory, the processor configured to:
        extract a first position defined as an existing position of a first partial image contained in the first image and a second position defined as an existing position of a second partial image contained in the second image, the second partial image corresponding to the first partial image;
        calculate a first differential quantity defined as a difference between the first position and the second position;
        generate a third image by translating the second image by the first difference quantity;
        extract a third position defined as an existing position of a third partial image contained in the first image;
        calculate a second differential quantity defined as a difference between the first position and the third position;
        calculate a fourth position, defined as a new existing position of a fourth partial image, by translating the second image by the second differential quantity, the fourth partial image being contained in the third image, the fourth partial image corresponding to the third partial image;
        generate a fourth image where the fourth partial image is located at the fourth position; and generate a stereoscopic picture based on the first image and the fourth image.

2. The stereoscopic picture generating apparatus according to claim 1, wherein the processor is configured to extract a fifth position defined as an existing position of a fifth partial image contained in the third image that corresponds to the first partial image, and calculate a third differential quantity defined as a difference between the first position and the fifth position, and the processor is further configured to calculate a fourth position defined as a new existing position of the fourth partial image contained in the third image that corresponds to the first partial image on the basis of the first differential quantity and the third differential quantity.

3. The stereoscopic picture generating apparatus according to claim 1, wherein the processor is configured to calculate a position of the first partial image in the depthwise direction, and the processor is further configured to calculate the fourth position defined as the new existing position of the fourth partial image contained in the third image that corresponds to the first partial image on the basis of the first differential quantity and the position in the depthwise direction.

4. A stereoscopic picture generating method, the stereoscopic picture generating method being executed by a computer, the stereoscopic picture generating method comprising:

extracting a first position defined as an existing position of a first partial image contained in a first image and a second position defined as an existing position of a second partial image contained in a second image from a storage device to get stored with the first image containing a plurality of partial images and the second image containing a plurality of partial images corresponding respectively to the plurality of partial images contained in the first image, the second partial image corresponding to the first partial image;

calculating a first differential quantity defined as a difference between the first position and the second position;

generating a third image by translating the second image by the first difference quantity;

extracting a third position defined as an existing position of a third partial image contained in the first image;

calculating a second differential quantity defined as a difference between the first position and the third position;

calculating a fourth position, defined as a new existing position of a fourth partial image, by translating the second image by the second differential quantity, the fourth partial image being contained in the third image, the fourth partial image corresponding to the third partial image;

generating a fourth image where the fourth partial image is located at the fourth position; and generating a stereoscopic picture based on the first image and the fourth image.

5. The stereoscopic picture generating method according to claim 4, wherein the stereoscopic picture generating method further comprises:

extracting a fifth position defined as an existing position of a fifth partial image contained in the third image that corresponds to the first partial image, and calculating a third differential quantity defined as a difference between the first position and the fifth position; and calculating a fourth position defined as a new existing position of the fourth partial image contained in the third image that corresponds to the first partial image on the basis of the first differential quantity and the third differential quantity.

6. The stereoscopic picture generating method according to claim 4, wherein the stereoscopic picture generating method further comprises:

calculating a position of the first partial image in the depthwise direction; and calculating the fourth position defined as the new existing position of the fourth partial image contained in the third image that corresponds to the first partial image on the basis of the first differential quantity and the position in the depthwise direction.

7. A non-transitory computer readable medium recorded with a stereoscopic picture generating program for making a computer execute:

extracting a first position defined as an existing position of a first partial image contained in a first image and a second position defined as an existing position of a second partial image contained in a second image from a storage device to get stored with the first image containing a plurality of partial images and the second image containing a plurality of partial images corresponding respectively to the plurality of partial images contained in the first image, the second partial image corresponding to the first partial image;

calculating a first differential quantity defined as a difference between the first position and the second position;

generating a third image by translating the second image by the first difference quantity;

extracting a third position defined as an existing position of a third partial image contained in the first image;

calculating a second differential quantity defined as a difference between the first position and the third position;

calculating a fourth position, defined as a new existing position of a fourth partial image, by translating the second image by the second differential quantity, the fourth partial image being contained in the third image, the fourth partial image corresponding to the third partial image;

generating a fourth image where the fourth partial image is located at the fourth position; and generating a stereoscopic picture based on the first image and the fourth image.

8. The non-transitory computer readable medium recorded with the stereoscopic picture generating program according to claim 7, further making the computer execute:

extracting a fifth position defined as an existing position of a fifth partial image contained in the third image that corresponds to the first partial image, and calculating a third differential quantity defined as a difference between the first position and the fifth position; and calculating a fourth position defined as a new existing position of the fourth partial image contained in the third image that corresponds to the first partial image on the basis of the first differential quantity and the third differential quantity.

9. The non-transitory computer readable medium recorded with the stereoscopic picture generating program according to claim 7, further making the computer execute:

calculating a position of the first partial image in the depthwise direction; and calculating the fourth position defined as the new existing position of the fourth partial image contained in the third image that corresponds to the first partial image on the basis of the first differential quantity and the position in the depthwise direction.

10. The stereoscopic picture generating apparatus according to claim 1, wherein the second differential quantity is determined to be a limit value of a parallax quantity when the calculated second differential quantity exceeds the limit value of the parallax quantity, wherein a person can recognize that a object on the first partial image and an object on the fourth partial image are the same object when the second differential quantity is lower than the limit value of the parallax quantity.

11. The stereoscopic picture generating method according to claim 4, wherein the second differential quantity is determined to be a limit value of a parallax quantity when the calculated second differential quantity exceeds the limit value of the parallax quantity, wherein a person can recognize that a object on the first partial image and an object on the fourth partial image are the same object when the second differential quantity is lower than the limit value of the parallax quantity.

12. The non-transitory computer readable medium recorded with the stereoscopic picture generating program according to claim 7, wherein the second differential quantity is determined to be a limit value of a parallax quantity when the calculated second differential quantity exceeds the limit value of the parallax quantity, wherein a person can recognize that a object on the first partial image and an object on the fourth partial image are the same object when the second differential quantity is lower than the limit value of the parallax quantity.

* * * * *